(12) United States Patent
Sellers et al.

(10) Patent No.: US 11,290,322 B2
(45) Date of Patent: Mar. 29, 2022

(54) HONEYPOT ASSET CLONING

(71) Applicant: Rapid7, Inc., Boston, MA (US)

(72) Inventors: Tom Sellers, Georgetown, TX (US);
Andreas Galauner, Aachen (DE)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 17/191,855

(22) Filed: Mar. 4, 2021

(65) Prior Publication Data

US 2021/0194762 A1   Jun. 24, 2021

Related U.S. Application Data

(63) Continuation of application No. 16/132,319, filed on Sep. 14, 2018, now Pat. No. 10,965,521.

(51) Int. Cl.
| | |
|---|---|
| *G06F 15/177* | (2006.01) |
| *H04L 41/0803* | (2022.01) |
| *H04L 41/0893* | (2022.01) |
| *H04L 29/06* | (2006.01) |
| *H04L 67/00* | (2022.01) |
| *H04L 41/12* | (2022.01) |

(52) U.S. Cl.
CPC ...... *H04L 41/0803* (2013.01); *H04L 41/0893* (2013.01); *H04L 63/1491* (2013.01); *H04L 63/20* (2013.01); *H04L 67/34* (2013.01); *H04L 41/12* (2013.01)

(58) Field of Classification Search
CPC ............. H04L 41/0803; H04L 41/0893; H04L 63/1491; H04L 63/20; H04L 67/34; H04L 41/12

USPC .......................................................... 709/220
See application file for complete search history.

(56) References Cited

U.S. PATENT DOCUMENTS

| | | | |
|---|---|---|---|
| 2008/0163210 A1* | 7/2008 | Bowman | G06F 9/5061 718/1 |
| 2014/0215464 A1* | 7/2014 | Birke | G06F 11/3006 718/1 |
| 2015/0363181 A1* | 12/2015 | Alberti | G06F 8/61 717/177 |

* cited by examiner

*Primary Examiner* — Atta Khan
(74) *Attorney, Agent, or Firm* — Ashwin Anand

(57) ABSTRACT

Disclosed herein are methods, systems, and processes for performing honeypot asset cloning in cybersecurity computing environments. A computing asset and associated configuration information is identified along with configuration requirements for a honeypot. The configuration is modified to generate replication configuration information based partly on the configuration requirements. The replication configuration information is deployed in the network. A request to manage a configuration deployment in the network is received. In response to the request, the computing asset is configured based on the configuration information and the honeypot is generated based on the replication configuration information. The configuration is normalized and mapping information that is part of the configuration information that is supported by the honeypot is identified. A value in the configuration is replaced with another value associated with the part of the configuration information that is supported by the honeypot.

15 Claims, 6 Drawing Sheets

HONEYPOT ASSET CLONING

CROSS-REFERENCE TO RELATED APPLICATIONS

The present application claims the benefit (and is a Continuation) of U.S. Utility patent application Ser. No. 16/132,319 filed on Sep. 14, 2018 titled "Honeypot Asset Cloning," the disclosure of which is incorporated by reference as if set forth in its entirety herein.

BACKGROUND

Field of the Disclosure

As an increasing number of applications and services are being made available over networks such as the internet, monitoring these networks is important to ensure reliable operation, fault detection, timely mitigation of potentially malicious activities, etc.

Conventional network environments rely on a combination of human resources and partially automated systems to perform security management, ad hoc data mingling, alert curation, and organizational understanding. Many of these network environments reply on network monitoring systems such as a honeypot network to collect network data and analyze the network data for information about attacks and other anomalous activities.

However, oftentimes it is difficult to configure network monitoring devices so that they go undetected from malicious attackers. In many situations, configuring network monitoring devices is a manual approach and generally requires customization of source code in order to match the operating behavior and identity of a specific complex computing device. Manual analysis can be time-consuming and inefficient. Further, manual analysis can result in delays. Further still, in many situations, it is impossible to completely match the specific operating behavior, network identity, and functionality of a specific computing device.

A need exists, therefore, for systems, methods, and devices that overcome this disadvantage.

SUMMARY OF THE DISCLOSURE

Disclosed herein are methods, systems, and processes to perform honeypot asset cloning. One such method involves identifying a computing asset and configuration information associated with the computing asset in a network, identifying one or more configuration requirements for a security appliance, modifying the configuration information associated with the computing asset to generate replication configuration information based partly on the one or more configuration requirements, deploying the replication configuration information in the network, and receiving a request to manage a configuration deployment in the network. In response to receiving the request, the method involves configuring the computing asset based on the configuration information and generating the security appliance based on the replication configuration information, normalizing the configuration information associated with the computing asset, identifying mapping information that is part of the configuration information that is supported by the security appliance, and replacing a value in the configuration information with another value associated with the part of the configuration information that is supported by the security appliance.

In certain embodiments, the method involves generating a configuration file based on the replication configuration information and generating the security appliance using the configuration file, where a portion of the security appliance is a copy of the computing asset. The configuration information for the computing asset includes at least an operating system version, a service banner, an open port, or a media access control (MAC) address. In some embodiments, the method involves distributing, via a component manager, the configuration information and the replication configuration information in the network, receiving the request at a resource manager that is configured to manage computing resource provisioning and computing resource usage for the computing asset and the security appliance, transmitting the request from the resource manager to the component manager, and storing the configuration information and the replication configuration information in a data store. In other embodiments, the method involves configuring the security appliance to emulate one or more services provided by the computing asset, receiving, at the security appliance, network data indicative of attacks or anomalous activities intended for the one or more services provided by the computing asset, and generating a remediation action to minimize security risk from the attacks or the anomalous activities.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

Figure 1:
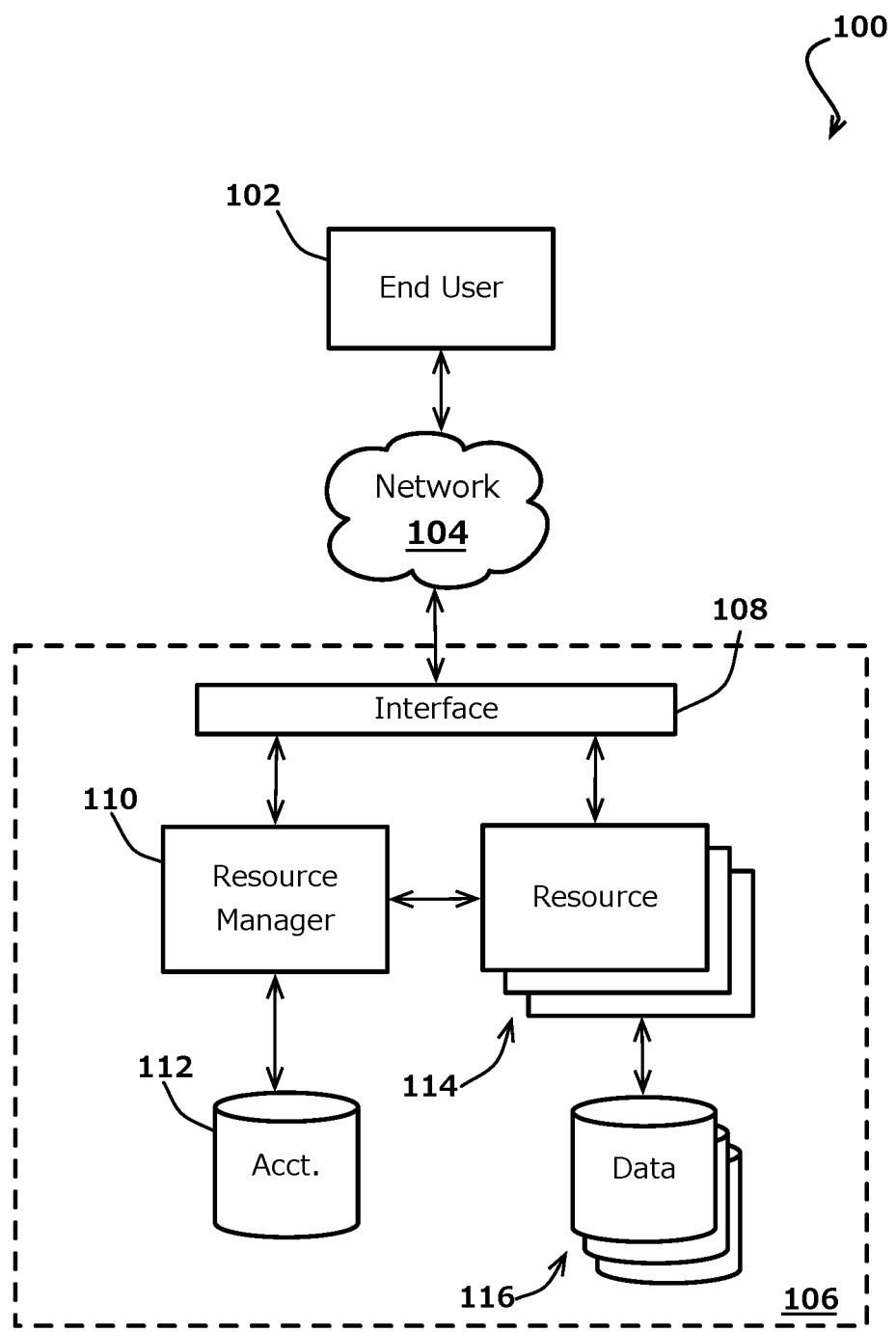
FIG. 1 illustrates an environment in which aspects of the various embodiments can be implemented in accordance with various embodiments.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Systems and methods in accordance with various embodiments of the present disclosure may overcome one or more of the aforementioned and other deficiencies experienced in conventional approaches to security asset configuration and deployment. In particular, a management component or other control component can manage distribution of configuration information, configuration information updates, or other information for host machines, servers, or other such computing devices or assets in a network environment.

For example, a request to deploy a security appliance (e.g., a "honeypot" monitoring component) configured to replicate functionality, behavior, and/or an identity of a computing device can be received at a management component of a threat analysis system or other such system. The request can include selection criteria specifying one or more computing devices to be replicated in the network environment. In this example, using the selection criteria, a computing device can be identified as well as information in a data store associated with the computing device. The identified information can be modified based on configuration requirements for a security appliance to create modified information. The modified information can be used to generate configuration information such as a configuration file which can be used to perform a number of actions in the network environment. For example, the management component, a deployment component, or other such component can configure a security appliance using the configuration information or generate a new security appliance, among other such actions, where at least a portion of the functionality or identification information of the security appliance substantially matches corresponding functionality and identification information of the specified computing device.

In accordance with various embodiments, configuring and/or generating one or more security appliances that are indistinguishable, at a surface level, from potential attacker targets in the environment allows these security appliances to collect and analyze network data for information about attacks and other anomalous activities. Such a global view of network data obtained by a network of networked devices can enable the system to provide functionality beneficial to all users. For example, the system can determine the state of a network to determine optimal usage parameters for that network, such as the optimal volume of data and connections for a particular port. Such an approach can provide a starting point for more in-depth research about new network attacks, techniques of attack, and network vulnerabilities that can be utilized to determine techniques to mitigate such attacks or other malicious behavior. Such techniques also allow a system to quickly recover from certain network events, such as network attacks, congestion, or temporary network failure.

In various embodiments, the distribution of configuration updates and/or other such information can occur over a connected network, which can utilize a number of different computing devices or assets (e.g., host computing devices, vulnerability management tools, network scanners, etc.). The network and the computing assets can be provided and/or utilized in any appropriate electronic environment, such as a data center offering in a shared resource or other multi-tenant environment, as well as any non-virtualized or otherwise private data center. Although various embodiments described herein are discussed in regard to a particular network (such as the one described in FIG. 1), it should be understood that embodiments described herein for managing configuration information or other information deployments can apply to any network. That is, in accordance with embodiments described herein, a management system or any control system can be used to automatically manage configuration information or other information deployments to any network. In still further embodiments, the management system can be provided as a service that can be used to remotely manage configuration information or other information deployments in a customer's network environment, while in still other embodiments, the management system can be provided to, and included as part of a customer's network environment, e.g., as a management system component or other such control component, that can be used to manage configuration information or other information deployments in accordance with embodiments described herein. In any situation, the management system can be used to sequentially, or concurrently, schedule and deploy configuration information, configuration information updates or other information, to any networked environment.

Various other functions and advantages are described and suggested below as may be provided in accordance with the various embodiments.

FIG. 1 illustrates an example environment 100 in which aspects of the various embodiments can be implemented. In this example a user is able to utilize a client device 102 to communicate across at least one network 104 with a resource provider environment 106. The client device 102 can include any appropriate electronic device operable to send and receive requests, messages, or other such information over an appropriate network and convey information back to a user of the device. Examples of such client devices 102 include personal computers, tablet computers, smart phones, notebook computers, and the like.

The network(s) 104 can include any appropriate network, including an intranet, the Internet, a cellular network, a local area network (LAN), or any other such network or combination, and communication over the network can be enabled via wired and/or wireless connections.

The resource provider environment 106 can include any appropriate components for receiving requests and returning information or performing actions in response to those requests. As an example, resource provider environment 106 might include Web servers and/or application servers for receiving and processing requests, then returning data, Web pages, video, audio, or other such content or information in response to the request. While this example is discussed with respect to the internet, web services, and internet-based technology, it should be understood that aspects of the various embodiments can be used with any appropriate services available or offered over a network in an electronic environment.

In various embodiments, resource provider environment 106 may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. Methods for enabling a user to reserve various resources and resource instances are well known in the art, such that detailed description of the entire process, and explanation of all possible components, will not be discussed in detail herein. In this example, resource provider environment 106 includes a plurality of resources 114 of one or more types. These types can include, for example, application servers operable to process instructions provided by a user or database servers operable to process data stored in one or more data stores 116 in response to a user request.

In various embodiments, resource provider environment 106 may include various types of resources that can be utilized for analyzing and reporting anomalous network activity. In this example, resource provider environment 106 includes a management component (not shown) operable to manage a threat analysis system. The management component may be hosted on multiple server computers and/or distributed across multiple systems. Additionally, the components may be implemented using any number of different computers and/or systems. Thus, the components may be separated into multiple services and/or over multiple different systems to perform the functionality described herein.

Resources 114 can further include one or more security appliances. A security appliance can accept connections from third party devices. A security appliance or "honeypot" can be a computing device and/or software configured to offer particular functionality ("honeypot functionality"), e.g., presenting services as available on one or more ports and/or emulating the actual functionality offered by these emulated services. For example, in an embodiment, individual security appliances can receive connections from various third-party devices seeking to access the functionality offered by the security appliances. In this situation, a security appliance can collect information regarding these connections for storage and/or analysis. The data can include, for example, an identifier to identify the network data, timestamp information, source internet protocol (P) address and source port of the computing device sending the network data, destination port IP address and destination port of the computing device receiving the network data, the communication protocol used to interconnect computing devices, etc.

In various embodiments, the resources 114 can take the form of servers (e.g., application servers or data servers) and/or components installed in those servers and/or various other computing assets. In some embodiments, at least a portion of the resources can be "virtual" resources supported by these and/or components. While various examples are presented with respect to shared and/or dedicated access to disk, data storage, hosts, and peripheral devices, it should be understood that any appropriate resource can be used within the scope of the various embodiments for any appropriate purpose, and any appropriate parameter of a resource can be monitored and used in configuration deployments.

In at least some embodiments, an application executing on the client device 102 that needs to access resources of the provider environment 106, for example, to manage network resources in response to malicious network activity, implemented as one or more services to which the application has subscribed, can submit a request that is received to interface layer 108 of the provider environment 106. The interface layer 108 can include application programming interfaces (APIs) or other exposed interfaces enabling a user to submit requests, such as Web service requests, to the provider environment 106. Interface layer 108 in this example can also include other components as well, such as at least one Web server, routing components, load balancers, and the like. When a request to access a resource is received at the interface layer 108 in some embodiments, information for the request can be directed to resource manager 110 or other such system, service, or component configured to manage user accounts and information, resource provisioning and usage, and other such aspects. Resource manager 110 receiving the request can perform tasks such as to communicate the request to a management component or other control component which can manage distribution of configuration information, configuration information updates, or other information for host machines, servers, or other such computing devices or assets in a network environment; authenticate an identity of the user submitting the request; as well as to determine whether that user has an existing account with the resource provider, where the account data may be stored in at least one data store 116 in the resource provider environment 106.

An interface layer 108 in at least one embodiment includes a scalable set of customer-facing servers that can provide the various APIs and return the appropriate responses based on the API specifications. Interface layer 108 also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or unmarshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In certain embodiments, a network may rely on network monitoring systems such as a honeypot network to collect network data and analyze the network data for information about attacks and other anomalous activities. In such a network, it can be advantageous to replicate, clone, or otherwise mimic network behavior and identification of certain networking devices on a network monitoring device to, e.g., attract potential attackers to engage with the network monitoring device and not other computing devices. It can be further advantageous to configure network monitoring devices to be indistinguishable from potential attacker targets.

However, in conventional network environments, configuring network monitoring devices with this level of fidelity, if performed at all, is typically a manual approach and generally requires customization of source code in order to match the operating behavior and identity of a specific complex computing device. Manual analysis can be time-consuming and inefficient. Further, manual analysis can be susceptible to human error. Further still, in many situations, it is impossible to completely match the specific operating behavior, network identity, and functionality of a specific computing device.

Accordingly, in accordance with various embodiments, a management component or other control component can manage distribution of configuration information, configuration information updates, or other information used to replicate the identity, operating behavior, and/or functionality of a network device. The configuration information can be based on any combination of specific attributes such as MAC address, open ports, service versions and banners, OS version, etc. from repositories of data about various subsystems that include these computing devices and other computing assets. The configuration information such as a configuration file can be used to configure a security appliance, generate a new security appliance, or a combination thereof, where the security appliance replicates at least a portion of the operating behavior, functionality, or identification information of a computing device. In this way, the configured security appliance is indistinguishable, at least at a surface level, from potential attacker targets in the network environment. Thereafter, as the configured security appliance masquerades as a computing device in the network environment, the configured security appliance can collect and analyze network data for information about attacks and other anomalous activities.

In accordance with various embodiments, the electronic environment in such cases might include additional components and/or other arrangements, such as those illustrated in the configuration 200 of FIG. 2, discussed in detail below.

Figure 2:
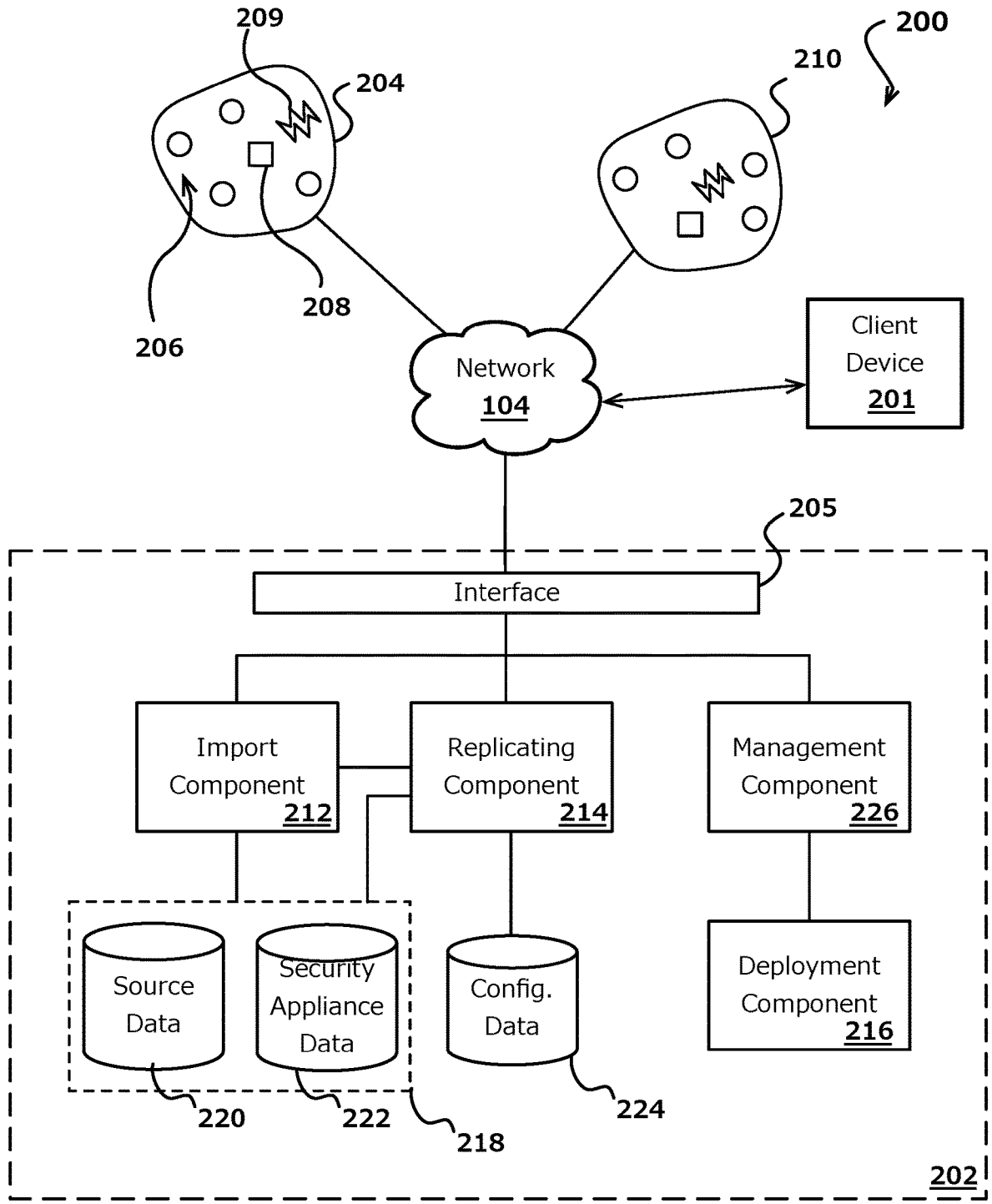
FIG. 2 illustrates a block diagram of components of an environment for managing configuration information that can be utilized in accordance with various embodiments.

FIG. 2 illustrates a block diagram 200 of components of an environment for managing configuration deployments that can be utilized in accordance with various embodiments. In this example, threat analysis system 202 includes import component 212, resource replicating component 214, deployment component 216, and control component 226. Threat analysis system 202 may also include one or more data stores 218, including, for example, computing device source data store 220 and security appliance data store 222, as well as configuration data store 224. Import component 212, resource replicating component 214, deployment component 216, and control component 226 may be hosted on multiple server computers and/or distributed across multiple systems. Additionally, the components may be performed by any number of different computers and/or systems. Thus, the components may be separated into multiple services and/or over multiple different systems to perform the functionality described herein. It should be noted that although the data stores are shown as separate data stores, data from the data stores can be maintained across fewer or additional data stores.

Threat analysis system 202 can be configured to communicate with one or more production systems 204, 210 or other network environments across network 104. In an embodiment, an example of a production system can include a vulnerability management system, a network scanning system, among other such systems.

In this example, production system 204 can include computing device 206 as well as other computing assets. A computing device can include various computing devices, software, or other such electronic resources. A computing device can include servers (e.g., application servers or data servers), laptops, printers, cameras, routers, and/or components installed in those servers and/or various other computing devices. In some embodiments, at least a portion of the computing assets can be "virtual" resources supported by these and/or components.

A production system can include one or more security appliances 208. As described, a security appliance can accept connections from third party entities (e.g., a hardware and/or software entity), such as third-party entity 209. A security appliance or "honeypot" can be a computing device and/or software configured to offer particular functionality ("honeypot functionality"), e.g., presenting services as available on one or more ports and/or emulating the actual functionality offered by these emulated services. In accordance with various embodiments, a security appliance can be configured and/or generated to replicate at least a portion of the functionality and/or identification information of a specific computing device. Once third-party entity 209 interacts with security appliance 208, security appliance 208 can be utilized to collect network data and analyze the network data for information about any attacks and other anomalous activities from third-party entity 209.

Based at least on the analyzed data, threat analysis system 202 can use the information, along with any other appropriate information, to provide customized security strategies and remediations. This can take the form of remediations to reduce security risks and minimize security threats, a report including an indication of a security action or identification of an asset, a user, or a security threat responsive to the query. Additionally, or alternatively, threat analysis system 202 can automatically perform a security action or other such action. This can include, for example, locking or at least restricting access to an electronic asset, contacting an authorized user of the electronic asset, supplementing information associated with one of the electronic asset, the user, or the security threat, or suspending operation of at least one operation on the electronic asset, among other such actions.

For example, a request might be received (over at least one network 104, such as the internet) from a client device 201 for a customer at interface layer 205, where information for the request can be directed to management component 226 or other such system, service, or component configured to manage deployment of configuration information, and other such aspects. In this example, a customer can include authorized users of a service provider, e.g., security analysis, IT personal, etc., authorized clients associated with the service provider, among other such users. Interface layer 205 may include any software and/or hardware components configured to send and receive communications and/or other information. Interface layer 205 may be configured to periodically receive data sets, queries, and/or any other relevant information from one or more components described herein.

Management component 226 includes functionality to enumerate, select, configure, or otherwise control a computing device "personality" (i.e., operating behavior, functionality, identification) cloning process. In this example, the request is to configure and/or generate a security appliance associated with functionality and/or identification information of a specific computing device. The request can include selection criteria specifying one or more computing devices to replicate in production systems 204, 210, or the like. Using the selection criteria, a computing device can be identified as well as information in data store 220 associated with the identified computing device.

The information in data store 220 can included data imported from various repositories of data from one or more production systems such as production systems 204 and 210. In this example, import component 212 can obtain information associated with computing devices from these production systems. The information can include attribute information for the computing devices that identifies an electronic device, service, or other resource of a provider and corresponding functionality. For example, the attribute information can include MAC addresses, open ports, service versions and banners, OS versions, and the like. It should be noted that other sources of data and types of data are contemplated in accordance with the various embodiments described herein, and the data sources and data type described are for example purposes.

Using the selection criteria, replicating component 214 or other such component can identify a computing device from the request as well as information in data store 220 associated with the identified computing device. Replicating component 214 can identify configuration requirements for one or more security appliances in data store 222. Configuration requirements can include, for example, functionality compatible with a particular security appliance. The identified information associated with the computing device can be modified based on configuration requirements for a security appliance to create modified information. The modified information can be used to generate configuration information which can be stored in configuration data store 224.

In accordance with various embodiments, creating modified information can include, for example, normalizing the identified information, determining mapping information that identifies a subset of the identified information supported by at least one security appliance, and replacing values in the identified information with values associated with the security appliance.

Normalizing information can include organizing the data in data store 220. This can include, for example, creating tables and establishing relationships between those tables according to rules to eliminate redundancy and inconsistent dependency. It should be noted that any one of or a combination of data normalizing techniques known in the art may be implemented in accordance with embodiments described herein. As an example, normalizing can include creating tables, establishing relationships between those tables, eliminating repeating groups in individual tables, creating separate tables for each set of related data, identifying each set of related data with a key, creating separate tables for sets of values that apply to multiple records, relating these tables for a different key, eliminating fields that do not depend on the key, etc.

The mapping information can identify information associated with a computing device that is supported by a security appliance.

Replacing values associated with the computing device with values associated with the security appliance can include replacing specific identifiers associated with a computing device with virtual security appliance specific data.

Deployment component 216 can configure a security appliance using the configuration information or generate a new security appliance using the configuration information, among other such actions. Once the security appliance is configured, at least a portion of the functionality or identification information of the security appliance substantially matches corresponding functionality and identification information from the identified computing asset. In this way, the configured security appliance is indistinguishable, at least at a surface level, from potential attacker targets in the environment, such as third-party attacker 209. Thereafter, as the configured security appliance masquerades as a computing device, the configured security appliance can collect and analyze network data for information about attacks and other anomalous activities.

Figure 3:
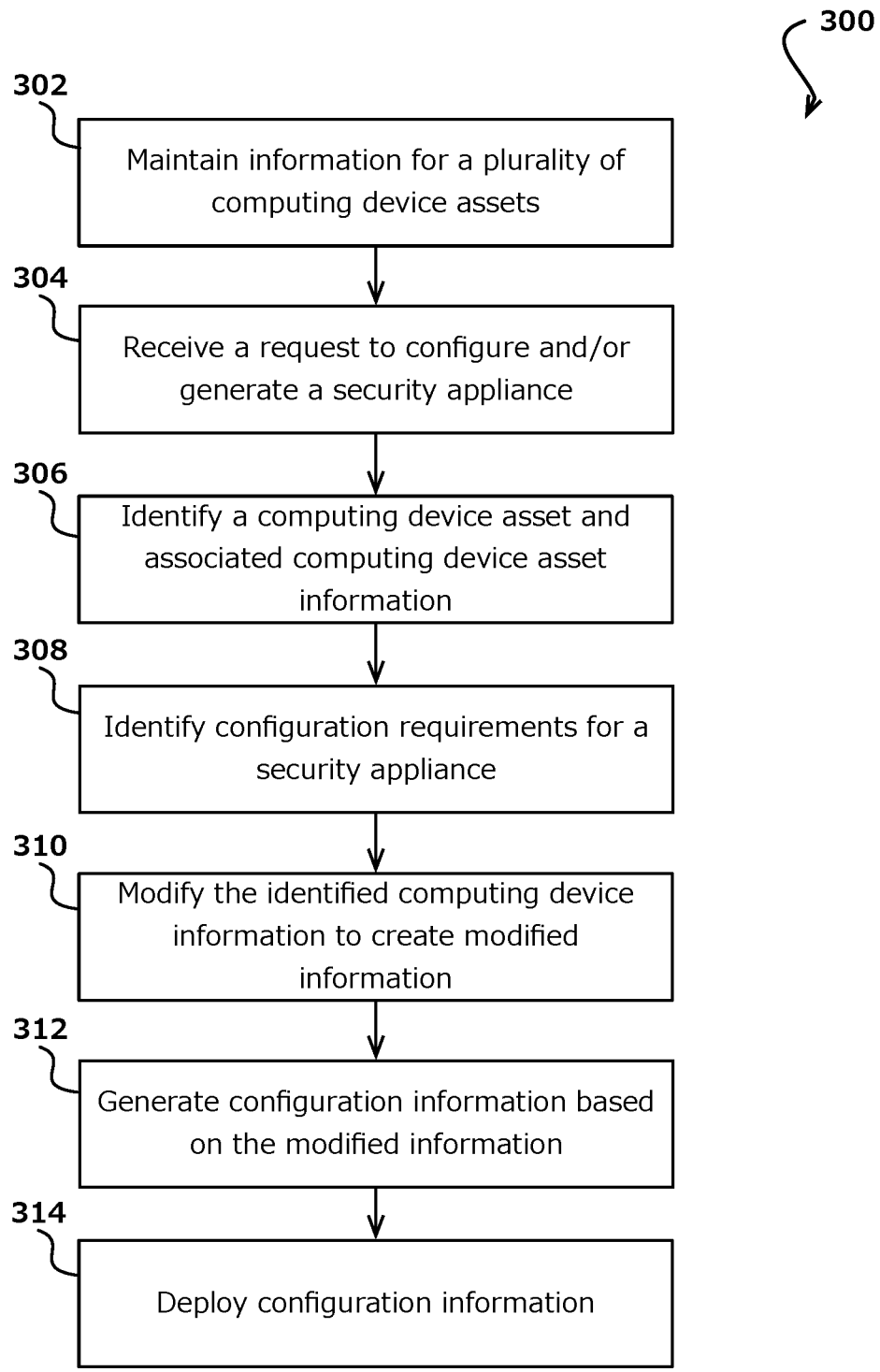
FIG. 3 illustrates a process for managing configuration information in accordance with various embodiments.

FIG. 3 illustrates a process 300 for managing configuration deployments in accordance with various embodiments. It should be understood that, for any process discussed herein, there can be additional, fewer, or alternative steps, performed in similar or different orders, or in parallel, within the scope of the various embodiments unless otherwise stated. In this example, at least one data store in a service provider environment maintains 302 information for a plurality of computing device assets connected to a computing system via a network. The computing device assets can include, for example, various computing devices, software, or other such electronic resources. A computing device can include a server (e.g., an application server or data server), a laptop, a printer, a camera, a router, and/or components installed in those devices. In some embodiments, at least a portion of the computing assets can be "virtual" resources supported by these and/or components.

A request to configure and/or generate a security appliance associated with functionality and/or identification information of a computing device asset can be received 304. The request can include selection criteria specifying one or more computing device assets to replicate. Using the selection criteria, the computing device asset can be identified 306 as well as information associated with the computing device asset. Configuration requirements for one or more security appliances can also be identified 308. The information associated with the computing device asset can specify device properties, device identification information, device usage history, etc. Device properties can specify the attributes of a device, such as device type (e.g., server, monitor, etc.), device connections (i.e., how the device connects with other devices), device resources (i.e., allocated resources by the type of device using resources such as direct memory access, input/output ports, interrupt request, memory addresses, etc.), and device connections (i.e., allocated resources by connection type such as DMA channels, I/O ports, etc.), among other such device properties.

Device identification information can include distinctive letters, numbers, visual codes, physical markings, etc. associated with the device that can be used to identify the device from other devices. Device usage history can include a log of feature usage activity. For example, a served client device or, in the case of a server device, a log of feature usage activity for all the served clients that belong to that server. In an embodiment, the log can provide a timestamp for the update event, indicate the status of the served client, and show the device ID (and device ID type), alias, host ID type, and features. Configuration requirements can include, for example, functionality compatible with a particular security appliance.

The identified information associated with the computing device asset can be modified 310 based on the configuration requirements for the security appliance to create modified information. The modified information can be used to generate 312 configuration information and other appropriate data to generate and/or update a security appliance, where at least a portion of the functionality or identification information of the security appliance substantially matches corresponding functionality and identification information for the identified computing asset. Thereafter, based at least in part on the request, the configuration information can be deployed 314 to perform at least one action.

Figure 4:
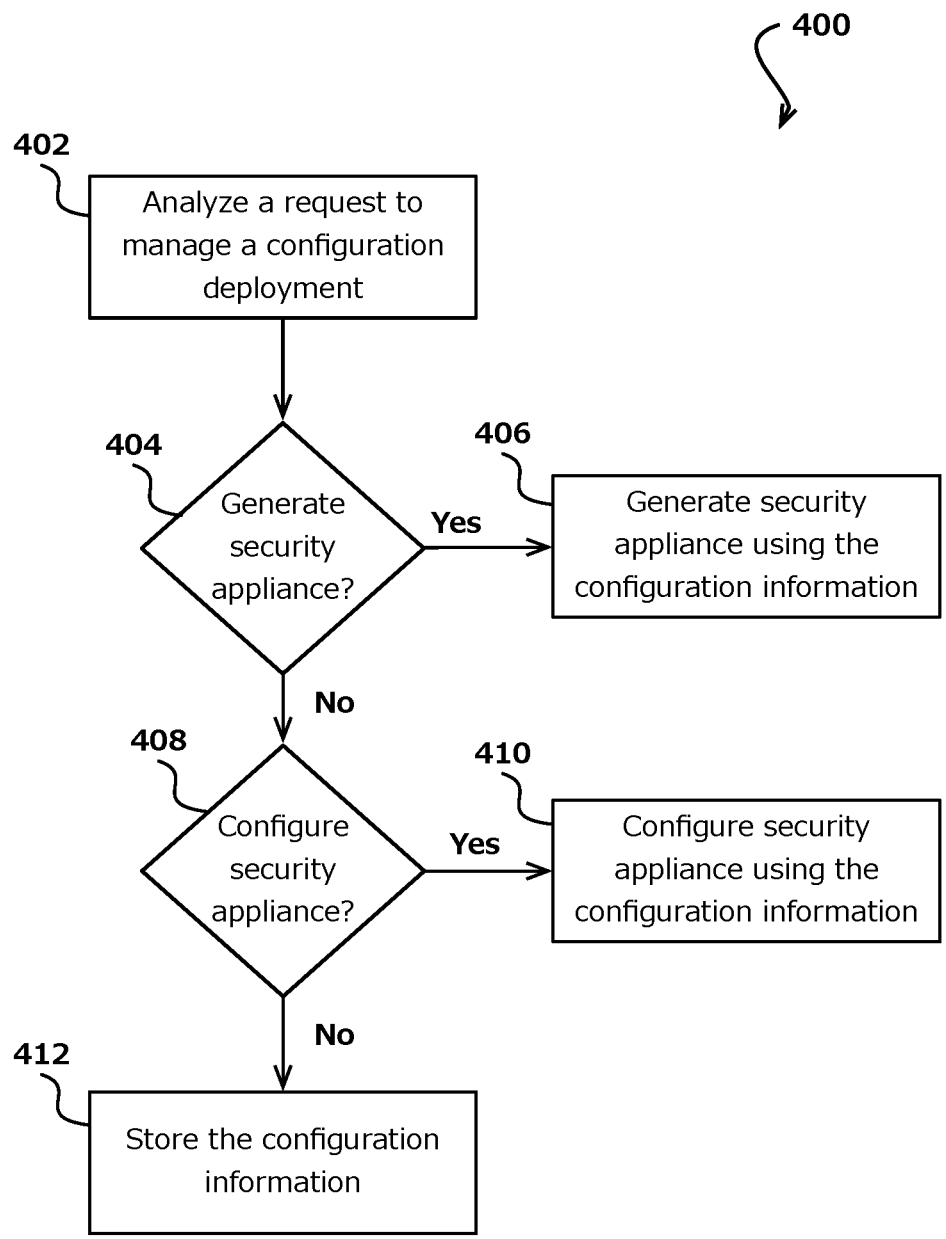
FIG. 4 illustrates an example process for managing configuration information in accordance with an additional embodiment.

For example, as shown in process 400 of FIG. 4, a request to manage a configuration deployment can be analyzed 402. A determination 404 can be made whether to generate a security appliance. In the situation where the request includes an instruction to generate a security appliance, the configuration information can be used to generate 406 a security appliance or other such replicated asset based at least in part on the configuration information. In the situation where the request does not include an instruction to generate a replicated asset, a determination 408 can be made whether to configure an existing security appliance. In the situation where the request includes an instruction to configure a security appliance, the configuration information can be utilized to configure 410 the security appliance based at least in part on the configuration information. In any situation, at least a portion of the security appliance is a copy of the identified computing device. In this way, as the configured security appliance masquerades as a computing device, the configured security appliance can collect and analyze network data for information about attacks and other anomalous activities. In the situation where the request does not include an instruction to generate a security appliance or update a security appliance, or includes an instruction to store the configuration information, the configuration information can be stored 412 in at least one data store. As described, it should be understood that, for any process discussed herein, there can be additional, fewer, or alternative steps, performed in similar or different orders, or in parallel, within the scope of the various embodiments unless otherwise stated.

Figure 5:
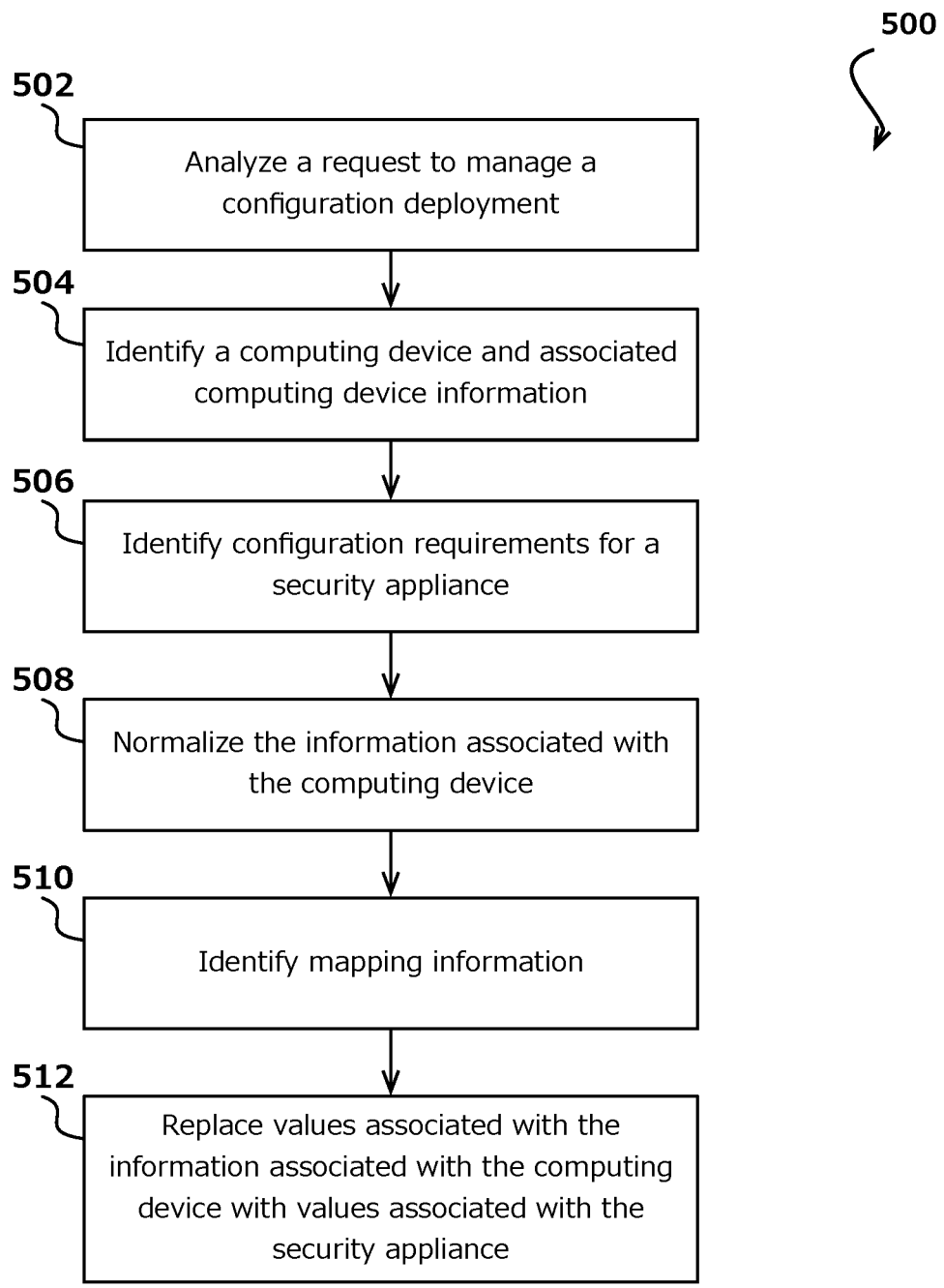
FIG. 5 illustrates an example process for modifying device information that can be utilized in accordance with various embodiments.

FIG. 5 illustrates an example process 500 for modifying device information in accordance with an embodiment. In this example, a request to manage a configuration deployment can be analyzed 502 to identify selection criteria. Based on the selection criteria, a computing device can be identified 504 as well as information associated with the computing device. Configuration requirements for one or more security appliances can also be identified 506. For example, the request can specify a number of clones, particular device or devices to clone such as devices associated with particular selection criteria (e.g., OS, services, physical, logical location, etc.) The identified information associated with the computing device can be normalized 508. In accordance with an embodiment, normalizing the identified information can include organizing the information in a data store. This can include, for example, creating tables and establishing relationships between those tables according to rules to eliminate redundancy and inconsistent dependency. Mapping information that identifies a subset of the identified information supported by at least one security appliance can be identified 510. In accordance with an embodiment, mapping information can be a lookup table or other such information that associates device capabilities and security appliance capabilities. Values associated with the identified information can be replaced 512 with values associated with the security appliance. For example, values associated with a SMTP hostname associated with the identified information can be replaced with corresponding values associated with the security appliance. Thereafter, configuration information is generated and can be used to configure a security appliance, generate a new security appliance, among other such actions, where at least a portion of the functionality or identification information of the security appliance substantially matches corresponding functionality and identification information the identified computing asset.

Figure 6:
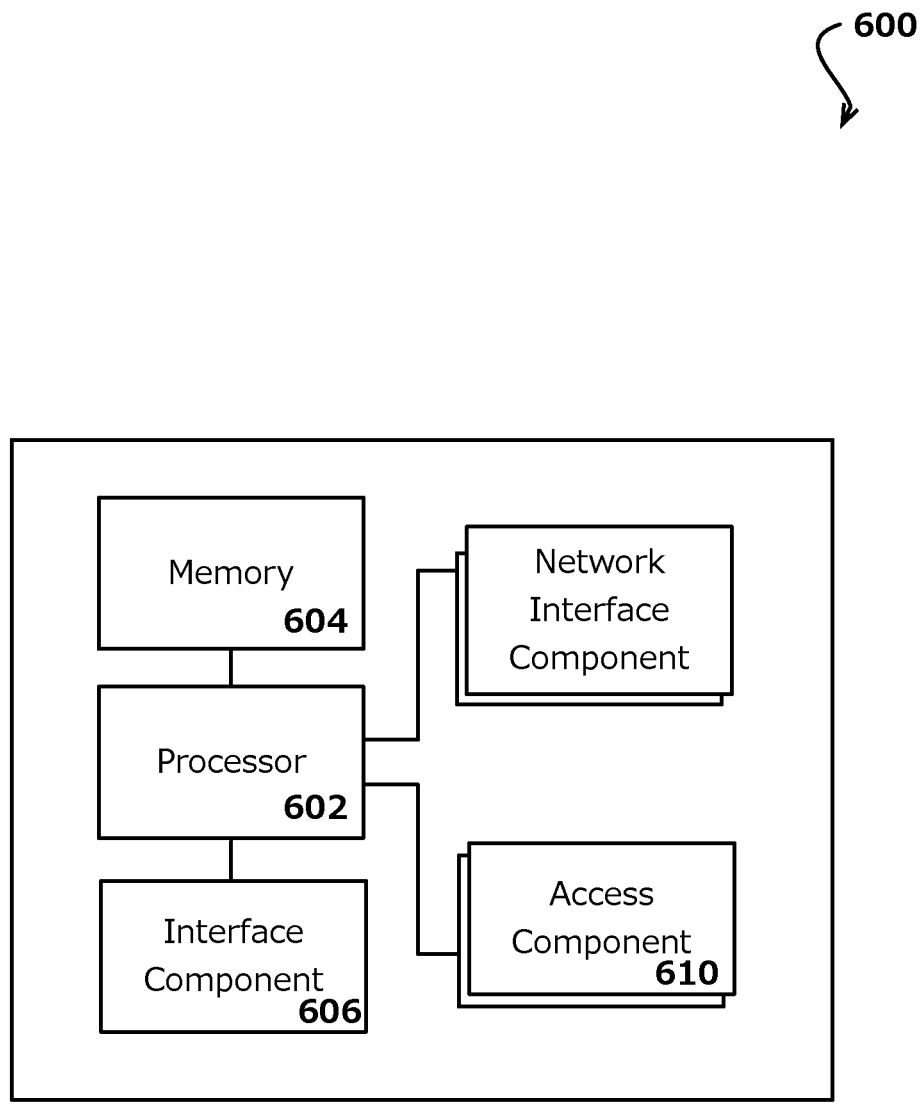
FIG. 6 illustrates a logical arrangement of a set components of an example computing device that can be utilized in accordance with various embodiments.

FIG. 6 illustrates an example set of basic components of a computing device 600 in accordance with various embodiments. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. As described herein, the instructions, when executed by the processor, can enable processor to maintain a data store in an electronic environment, the data store including information regarding a plurality of computing device assets connected to the computing system via a network, receive a request to manage configuration deployments, the request comprising selection criteria, identify, based at least in part on the selection criteria associated with the request, at least one computing asset in the plurality of computing device assets, identify information in the data store associated with the at least one identified computing asset, modify the identified information based at least in part on configuration requirements for at least one replicated asset to create modified asset identifying information, generate at least one configuration file based at least in part on the modified asset identifying information, and configure the at least one replicated asset using the at least one configuration file, wherein at least a portion of the at least one replicated asset is a copy of the at least one identified computing asset.

The device in some embodiments will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. The display screen can display insights and other information described herein.

As discussed, the device can include one or more networking components 608 enabling the computing device to communicate over one or more networks, whether wired and/or wireless. The example device can also include at least one additional input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   identifying a computing asset and configuration information associated with the computing asset in a network;
   identifying one or more configuration requirements for a security appliance;
   modifying the configuration information associated with the computing asset to generate replication configuration information based partly on the one or more configuration requirements;
   deploying the replication configuration information in the network;
   receiving a request to manage a configuration deployment in the network;
   in response to receiving the request,
     configuring the computing asset based on the configuration information, and
     generating the security appliance based on the replication configuration information;
   normalizing the configuration information associated with the computing asset;
   identifying mapping information that is part of the configuration information that is supported by the security appliance; and
   replacing a value in the configuration information with another value associated with the part of the configuration information that is supported by the security appliance.

2. The computer-implemented method of claim 1, further comprising:

generating a configuration file based on the replication configuration information; and generating the security appliance using the configuration file, wherein
a portion of the security appliance is a copy of the computing asset.

3. The computer-implemented method of claim 1, wherein
the configuration information for the computing asset comprises at least an operating system version, a service banner, an open port, or a media access control (MAC) address.

4. The computer-implemented method of claim 1, further comprising:
distributing, via a component manager, the configuration information and the replication configuration information in the network;
receiving the request at a resource manager that is configured to manage computing resource provisioning and computing resource usage for the computing asset and the security appliance;
transmitting the request from the resource manager to the component manager; and
storing the configuration information and the replication configuration information in a data store.

5. The computer-implemented method of claim 1, further comprising:
configuring the security appliance to emulate one or more services provided by the computing asset;
receiving, at the security appliance, network data indicative of one or more attacks or one or more anomalous activities intended for the one or more services provided by the computing asset; and
generating a remediation action to minimize security risk from the one or more attacks or the one or more anomalous activities.

6. A non-transitory computer readable storage medium comprising program instructions executable to:
identify a computing asset and configuration information associated with the computing asset in a network;
identify one or more configuration requirements for a security appliance;
modify the configuration information associated with the computing asset to generate replication configuration information based partly on the one or more configuration requirements;
deploy the replication configuration information in the network;
receive a request to manage a configuration deployment in the network;
in response to receiving the request,
configure the computing asset based on the configuration information, and
generate the security appliance based on the replication configuration information;
normalize the configuration information associated with the computing asset;
identify mapping information that is part of the configuration information that is supported by the security appliance; and
replace a value in the configuration information with another value associated with the part of the configuration information that is supported by the security appliance.

7. The non-transitory computer readable storage medium of claim 6, further comprising:

generating a configuration file based on the replication configuration information; and
generating the security appliance using the configuration file, wherein
a portion of the security appliance is a copy of the computing asset.

8. The non-transitory computer readable storage medium of claim 6, wherein
the configuration information for the computing asset comprises at least an operating system version, a service banner, an open port, or a media access control (MAC) address.

9. The non-transitory computer readable storage medium of claim 6, further comprising:
distributing, via a component manager, the configuration information and the replication configuration information in the network;
receiving the request at a resource manager that is configured to manage computing resource provisioning and computing resource usage for the computing asset and the security appliance;
transmitting the request from the resource manager to the component manager; and
storing the configuration information and the replication configuration information in a data store.

10. The non-transitory computer readable storage medium of claim 6, further comprising:
configuring the security appliance to emulate one or more services provided by the computing asset;
receiving, at the security appliance, network data indicative of one or more attacks or one or more anomalous activities intended for the one or more services provided by the computing asset; and
generating a remediation action to minimize security risk from the one or more attacks or the one or more anomalous activities.

11. A system comprising:
one or more processors; and
a memory coupled to the one or more processors, wherein the memory stores program instructions executable by the one or more processors to:
identify a computing asset and configuration information associated with the computing asset in a network;
identify one or more configuration requirements for a security appliance;
modify the configuration information associated with the computing asset to generate replication configuration information based partly on the one or more configuration requirements;
deploy the replication configuration information in the network;
receive a request to manage a configuration deployment in the network;
in response to receiving the request,
configure the computing asset based on the configuration information, and
generate the security appliance based on the replication configuration information;
normalize the configuration information associated with the computing asset;
identify mapping information that is part of the configuration information that is supported by the security appliance; and
replace a value in the configuration information with another value associated with the part of the configuration information that is supported by the security appliance.

12. The system of claim 11, further comprising:

generating a configuration file based on the replication configuration information; and generating the security appliance using the configuration file, wherein a portion of the security appliance is a copy of the computing asset.

13. The system of claim 11, wherein the configuration information for the computing asset comprises at least an operating system version, a service banner, an open port, or a media access control (MAC) address.

14. The system of claim 11, further comprising:

distributing, via a component manager, the configuration information and the replication configuration information in the network;

receiving the request at a resource manager that is configured to manage computing resource provisioning and computing resource usage for the computing asset and the security appliance;

transmitting the request from the resource manager to the component manager; and storing the configuration information and the replication configuration information in a data store.

15. The system of claim 11, further comprising:

configuring the security appliance to emulate one or more services provided by the computing asset;

receiving, at the security appliance, network data indicative of one or more attacks or one or more anomalous activities intended for the one or more services provided by the computing asset; and generating a remediation action to minimize security risk from the one or more attacks or the one or more anomalous activities.

* * * * *